United States Patent
Gong et al.

(10) Patent No.: US 9,941,726 B2
(45) Date of Patent: Apr. 10, 2018

(54) PROTECTION AND MANAGEMENT OF A POWER SUPPLY OUTPUT SHORTED TO GROUND

(71) Applicant: Infineon Technologies Austria AG, Villach (AT)

(72) Inventors: Xiaowu Gong, Singapore (SG); Yong Siang Teo, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 170 days.

(21) Appl. No.: 15/135,089

(22) Filed: Apr. 21, 2016

(65) Prior Publication Data
US 2017/0310121 A1    Oct. 26, 2017

(51) Int. Cl.
*H02J 7/00* (2006.01)
*H02J 7/14* (2006.01)
*H02J 7/34* (2006.01)

(52) U.S. Cl.
CPC ............ *H02J 7/007* (2013.01); *H02J 7/0052* (2013.01); *H02J 7/0008* (2013.01); *H02J 7/345* (2013.01)

(58) Field of Classification Search
USPC ........ 320/134, 136, 106, 110, 116, 165, 166
See application file for complete search history.

(56) References Cited

U.S. PATENT DOCUMENTS

| | | | | |
|---|---|---|---|---|
| 6,043,625 A | * | 3/2000 | Dowe | H02J 7/0008 320/106 |
| 8,378,868 B2 | * | 2/2013 | Lyles | G01R 31/3658 320/134 |
| 2006/0006846 A1 | * | 1/2006 | Kishibata | H02J 7/1438 322/28 |
| 2012/0162828 A1 | * | 6/2012 | Holsen | G06F 1/263 361/1 |
| 2012/0166855 A1 | * | 6/2012 | Holsen | G01R 31/3658 713/340 |
| 2013/0099759 A1 | * | 4/2013 | Ura | B62D 5/046 323/234 |

OTHER PUBLICATIONS

"CoolSET™-F3," Infineon, Power Management & Supply, Datasheet, Version 2.3, Apr. 2, 2013, 32 pp.

* cited by examiner

*Primary Examiner* — Alexis Pacheco
(74) *Attorney, Agent, or Firm* — Shumaker & Sieffert, P.A.

(57) ABSTRACT

In some examples, a circuit is configured to receive an input signal and deliver, based on the input signal, a charging current to a capacitor. The circuit may be further configured to receive an output voltage that indicates a charge on the capacitor. The circuit may be further configured to determine that the output voltage is shorted to a reference ground. The circuit may be further configured to reduce, based on determining that the output voltage is shorted to the reference ground, the charging current.

20 Claims, 9 Drawing Sheets

PROTECTION AND MANAGEMENT OF A POWER SUPPLY OUTPUT SHORTED TO GROUND

TECHNICAL FIELD

This disclosure relates to electric circuits and, more particularly, to power supply circuits.

BACKGROUND

A power supply unit may convert one form of electrical energy to another form of electrical energy. An energy source, such as a battery or an electrical grid, may input electrical energy to the power supply unit. In the example of the electrical grid, the power supply unit may receive alternating current ("AC") at 120 volts with a frequency of 60 Hertz.

Electronic devices, such as laptops, mobile devices, tablets, and others, may require electrical energy in the form of direct current ("DC"). Therefore, a power supply unit may convert an AC signal to DC current or DC voltage for an electronic device.

SUMMARY

This disclosure describes techniques for a circuit configured to receive an input signal and deliver, based on the input signal, a charging current to a capacitor. The circuit is further configured to receive an output voltage that indicates a charge on the capacitor. The circuit is further configured to determine that the output voltage is shorted to a reference ground. The circuit is further configured to reduce, based on determining that the output voltage is shorted to the reference ground, the charging current.

In some examples, a circuit is configured to receive an output voltage that indicates a charge on a capacitor. The circuit is further configured to determine that the output voltage is lower than a reference voltage. The circuit is further configured to deliver, based on determining that the output voltage is lower than the reference voltage, a charging current to a capacitor that is proportional to the output voltage when the output voltage is lower than the reference voltage.

In some examples, a method includes delivering a charging current to a capacitor, receiving an output voltage that indicates the charge on the capacitor, comparing the output voltage to a reference voltage, and controlling, based on comparing the output voltage to a reference voltage, the charging current.

The details of one or more examples are set forth in the accompanying drawings and the description below. Other features, objects, and advantages will be apparent from the description and drawings, and from the claims.

DETAILED DESCRIPTION

Quickly charging and delivering a power supply at startup may be an important characteristic for an electronic device. A high charging current may quickly charge the power supply output, but a high charging current may also dissipate unnecessary power if a short circuit exists between the power supply output and reference ground. Therefore, a desirable power supply may deliver a charging circuit that quickly charges the power supply output, while preventing unnecessary power dissipation and possible damage when the power supply output is shorted to ground.

To reduce charging time, a circuit may deliver a high charging current at startup. To protect against unnecessary power dissipation and possible damage due to a short circuit, the circuit may set a timer. When the timer expires, if the voltage at the power supply output has not increased beyond a reference voltage, the charging circuit may reduce the charging current to a low level until the voltage at the power supply output exceeds the reference voltage.

Another technique for reducing charging time and detecting a short circuit may include a voltage-controlled current source ("VCCS"). When the voltage at the power supply output is lower than a reference voltage, the VCCS may deliver a charging current that is proportional to the voltage at the power supply output. Thus, a short circuit between the power supply output and the reference ground may result in low power dissipation because the VCCS may deliver a low charging current. As the voltage at the power supply output increases, the VCCS may increase the charging current in proportion. When the voltage at the power supply output exceeds a reference voltage, the charging circuit may deliver a high charging current at a constant level to quickly charge the power supply output.

Figure 1:
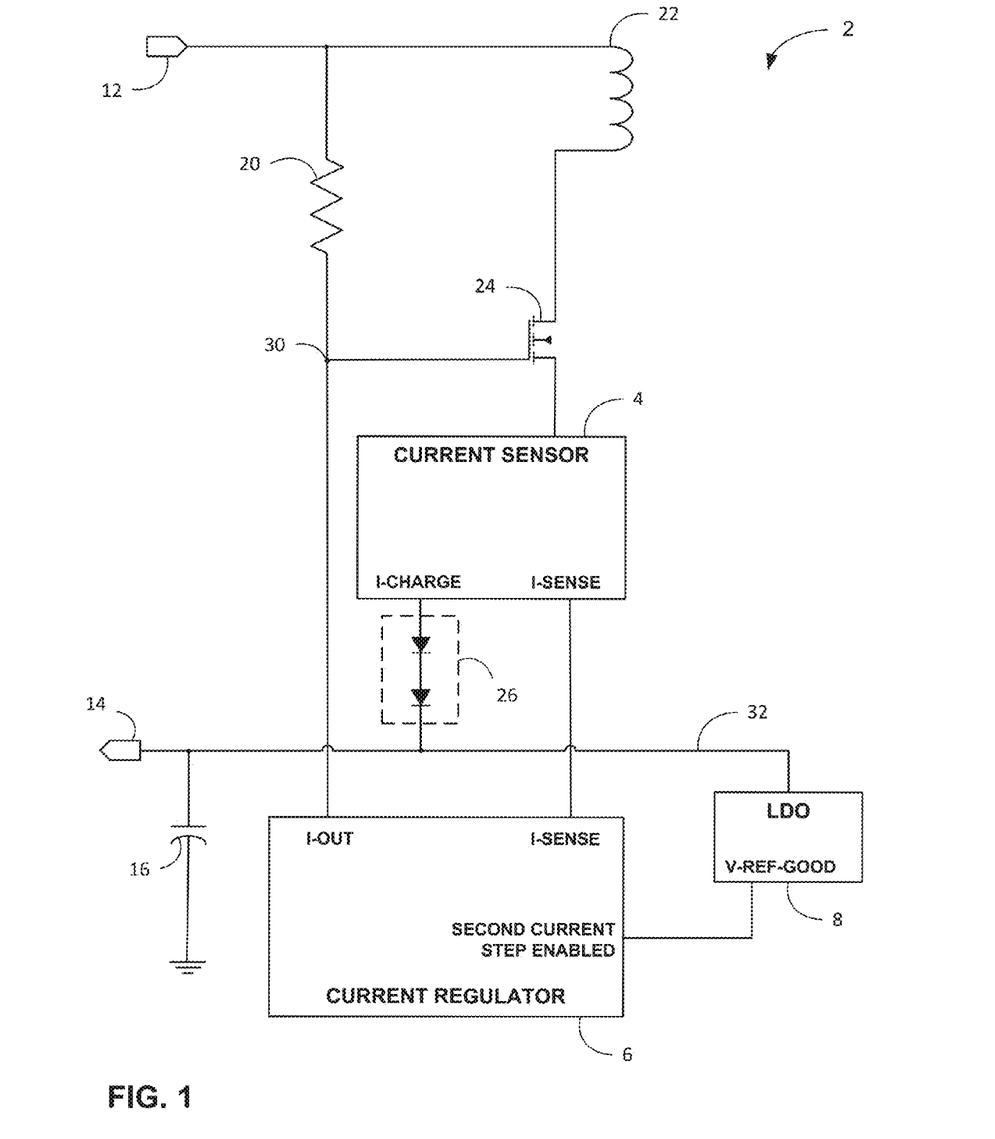
FIG. 1 is a conceptual block and circuit diagram illustrating a circuit for charging an output voltage in accordance with some examples of this disclosure.

FIG. 1 is a conceptual block and circuit diagram illustrating a circuit 2 for charging an output voltage in accordance with some examples of this disclosure. Circuit 2 may include current sensor 4, current regulator 6, and low drop-out ("LDO") regulator 8, as well as other components. Circuit 2 may be part of a larger device or system, such as an electronic device or a mechanical device. Circuit 2 may operate as a power supply for the larger device or system.

Input node 12 may receive an electrical signal from a power source, such as an electrical grid or a battery. The electrical signal may be a voltage signal or a current signal, such as an AC signal from the electrical grid. The electrical signal may also be a DC signal. Although depicted as a single node with a single connected line, input node 12 may receive electrical signals with multiple phases. Circuit 2 may be a part of a larger device or system (not shown in FIG. 1). At startup for the larger device or system, input node 12 may begin receiving an electrical signal.

Resistor 20 and inductor 22 may be coupled to input node 12. Resistor 20 and inductor 22 may receive the electrical signal from input node 12. The voltage across resistor 20 may be proportional to the electrical current through resistor 20. The electrical signal, through resistor 20, may affect the voltage or current at control node 30. When the voltage at input node 12 is relatively high, resistor 20 may "pull up" the voltage at control node 30, which may cause transistor 24 to conduct an electrical current.

Inductor 22 may pass the electrical signal from input node 12 to an upper load terminal of transistor 24. Depending on the inductance of inductor 22, inductor 22 may block high-frequency AC electrical signals received at input node 12. Inductor may allow DC electrical signals and low-frequency AC electrical signals to pass from input node 12 to the upper load terminal of transistor 24. The frequency response of inductor 22 may be based on the inductance of inductor 22.

Transistor 24 may comprise a metal-oxide semiconductor ("MOS") field-effect transistor ("FET"), a junction gate FET ("JFET"), a bipolar junction transistor ("BJT"), or another appropriate device. Transistor 24 may include two load terminals and a control terminal coupled to resistor 20 via control node 30. The upper load terminal of transistor 24 may be coupled to inductor 22, and the lower load terminal of transistor 24 may be coupled to current sensor 4. If transistor 24 is a FET, the control terminal may be called a gate, and the load terminals may be called a source and a drain. Depending on the voltage at control node 30 and the load terminals of transistor 24, an electrical current may flow from input node 12 through inductor 22 and transistor 24 to current sensor 4. In some examples, a high-voltage DC electrical signal received by input node 12 may cause transistor 24 to conduct current to current sensor 4. In some examples, transistor 24 may be a depletion-mode MOSFET, which may conduct current for a larger range of voltages at control node 30. In these examples, resistor 20 may not be necessary to "pull up" the voltage at control node 30.

Current sensor 4 may be configured to receive an input signal from transistor 24 and output a charging current through diodes 26. Current sensor 4 may be configured to deliver the charging current based on the input signal received from transistor 24. In some examples, current sensor 4 may deliver a charging current that is proportional to the input signal from transistor 24. In addition, current sensor 4 may output a sense signal to current regulator 6, where the sense signal indicates the amplitude of the charging current. The sense signal may include an electrical current that is proportional to the charging current. Current sensor 4 may include a Hall effect integrated circuit sensor, a transformer meter, a fiber optic current sensor, or a Rogowski coil.

Output node 14 may receive the charging current from current sensor 4 via diodes 26. In some examples, diodes 26 may be semiconductor diodes such as Schottky diodes or Zener diodes. Output node 14 may deliver an output voltage to another electronic circuit or device outside of circuit 2. Output node 14 may be coupled to capacitor 16, which may be a smoothing capacitor to block high-frequency signals. At startup of the larger device or system of which circuit 2 may be a part, the charging current from current sensor 4 may affect the charge on the upper plate of capacitor 16.

Capacitor 16 may be coupled between output node 14 and reference ground. Capacitor 16 may store or release charge based on the equation, $$i(t) = C \frac{dv(t)}{dt}.$$

In this equation, i(t) is the current flowing out of capacitor 16, C is the capacitance of capacitor 16, and $$\frac{dv(t)}{dt}$$

is the rate of change of the voltage at output node 14 as a function of time. If the charging current received by capacitor 16 is zero, the voltage at output node 14 may be constant. In some examples, capacitor 16 may function as a smoothing capacitor to smooth the output signal at output node 14 to produce a DC output signal. A short circuit across capacitor 16 may cause output node 14 to be shorted to reference ground.

LDO regulator 8 may be configured to receive a signal indicating the voltage at output node 14 via output line 32. LDO regulator 8 may be configured to communicate to current regulator 6 whether the voltage at output node 14 is higher than a reference voltage. LDO regulator 8 may deliver a signal to current regulator 6 indicating the voltage at output node 14. LDO regulator 8 may be configured to output a zero signal when the voltage at output node 14 is lower than a reference voltage. When the voltage at output node 14 is higher than a reference voltage, LDO regulator 8 may be configured to output a nonzero signal. The reference voltage may be small compared to the desired voltage at output node 14. In some examples, the reference voltage may be lower than two volts when the desired voltage at output node 14 is more than ten volts. In other examples, the reference voltage may be some other amount that is high enough for circuit 2 to detect a short circuit at output node 14, but low enough to ensure quick charging of the voltage at output node 14.

Current regulator 6 may be configured to increase or decrease the voltage at control node 30 based on signals received from current sensor 4 and LDO regulator 8. Current regulator 6 may receive a sense signal from current sensor 4, where the sense signal indicates the amplitude of the charging current. Current regulator 6 may receive a signal from LDO regulator 8 indicating whether the voltage at output node 14 exceeds a reference voltage.

Current regulator 6 may be configured to increase the voltage at control node 30 in response to receiving a high signal from LDO regulator 8 and a low sense signal from current sensor 4. A high signal from LDO regulator 8 may indicate that output node 14 is not shorted to reference ground because the voltage output node 14 exceeds the reference voltage. A low sense signal from current sensor 4 may indicate that current sensor 4 is delivering a low charging current to output node 14. Based on determining that output node 14 is not shorted to reference ground and that the charging current is low, current regulator may control the voltage at control node 30 to increase the input signal received by current sensor 4 from transistor 24. The change in voltage at control node 30 may be called a second current step, as shown within current regulator 6 in FIG. 1.

Current regulator 6 may be configured to control the voltage at control node 30 in response to receiving a low signal from LDO regulator 8 and a high sense signal from current sensor 4. A low signal from LDO regulator 8 may indicate that the voltage at output node 14 is lower than the reference voltage, possibly because output node 14 is shorted to reference ground. A high sense signal from current sensor 4 may indicate that current sensor 4 is delivering a high charging current to output node 14. Based on determining that output node 14 may be shorted to reference ground and that the charging current is high, current regulator may control the voltage at control node 30 to reduce the input signal flowing through transistor 24. A short circuit between output node 14 and reference ground may prevent a high current from flowing through transistor 24 to output node 14, given the techniques in this disclosure.

By reducing the input signal flowing through transistor 24, current regulator 6 may reduce the charging current delivered by current sensor 4 to output node 14. A small charging current may reduce power dissipation in circuit 2, in the event that output node 14 is shorted to reference ground. Output node 14 may be shorted to reference ground for a variety of reasons, including capacitor damage, moisture, or a soldering error. Some reasons, such as moisture, may be temporary, while other reasons may be permanent. The techniques described herein allow for quick charging of the voltage at output node 14 while preventing high power dissipation and possible damage to circuit 2 when output node 14 is shorted to reference ground.

Figure 2:
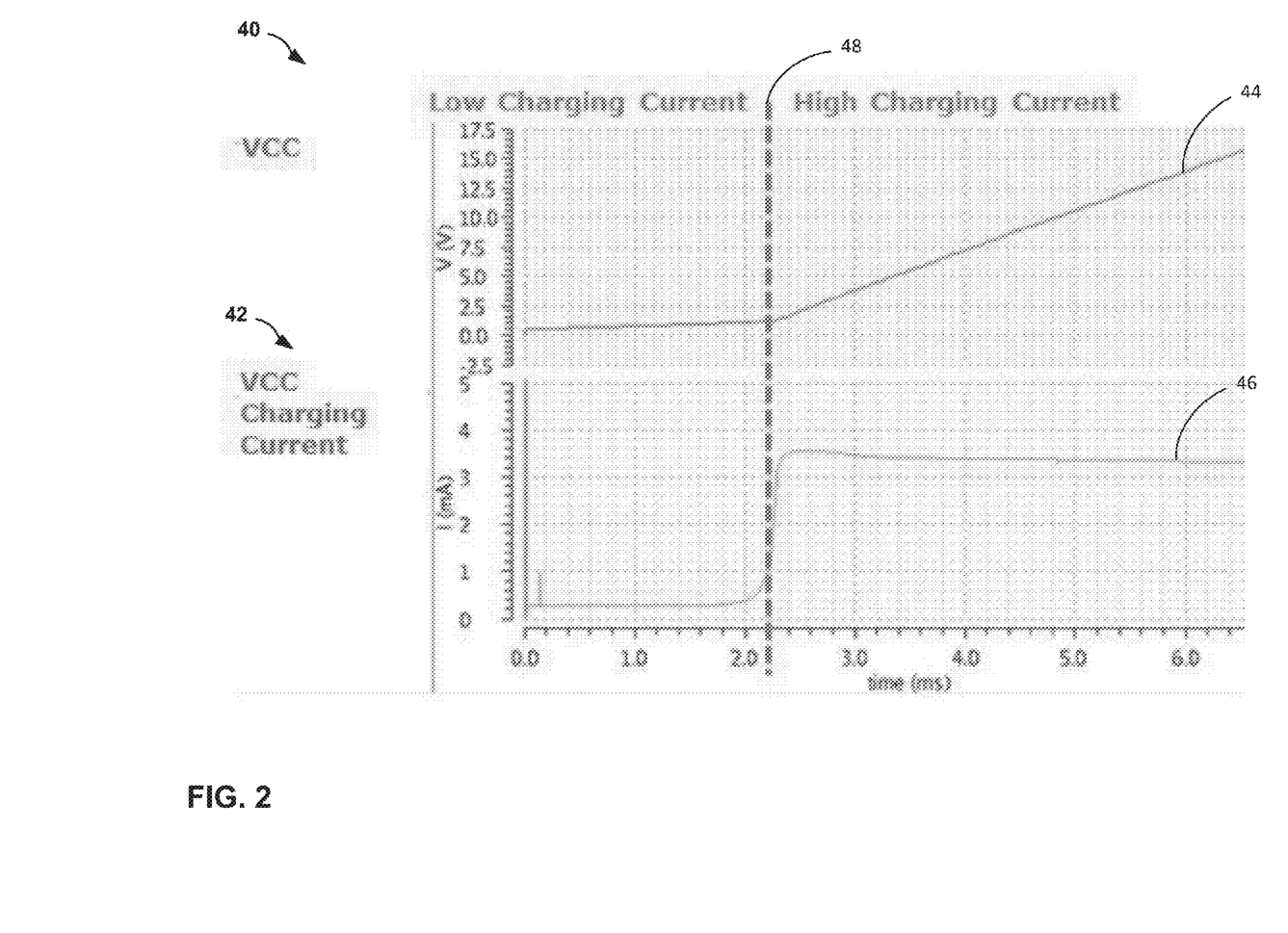
FIG. 2 is graphical comparison of two graphs of an output voltage and a charging current over time in accordance with some examples of this disclosure.

FIG. 2 is graphical comparison of two graphs 40, 42 of an output voltage 44 and a charging current 46 over time in accordance with some examples of this disclosure. In some examples, graph 40 may depict the voltage at output node 14 of FIG. 1, and graph 42 may depict the charging current 46 delivered by current sensor 4 of FIG. 1. The horizontal axes of graphs 40, 42 may depict time. The vertical axis of graph 40 may depict voltage in volts. The vertical axis of graph 42 may depict electrical current in milliamperes.

Output voltage 44 may begin at a level near zero volts on the left side of graph 40. The left side of graphs 40, 42 may represent the startup of the larger device or system of which circuit 2 in FIG. 1 may be a part. At startup, output voltage 44 may increase gradually until time 48 when output voltage 44 increases at a higher rate. Time 48 may correspond to a time when LDO regulator 8 in FIG. 1 determines that output voltage 44 exceeds a reference voltage, such as lower than two volts.

Charging current 46 may begin at a low level, such as two hundred microamperes, on the left side of graph 42. Charging current 46 may remain at the low level until time 48 when charging current 46 may increase to a higher level, such as three or four milliamperes. The higher charging current 46 after time 48 may cause output voltage 44 to increase more quickly. Current regulator 6 in FIG. 1 may increase charging current 46 after time 48 based on receiving a signal from LDO regulator 8 indicating that output voltage 44 exceeds the reference voltage.

Graphs 40, 42 illustrate how circuit 2 of FIG. 1 may reduce power dissipation when output node 14 is shorted to reference ground. Current sensor 4 and current regulator 6 may be configured to deliver a low charging current 46 when output voltage 44 is lower than a reference voltage. A low charging current 46 may reduce power dissipation within circuit 2 when output node 14 is shorted to reference ground.

Figure 3:
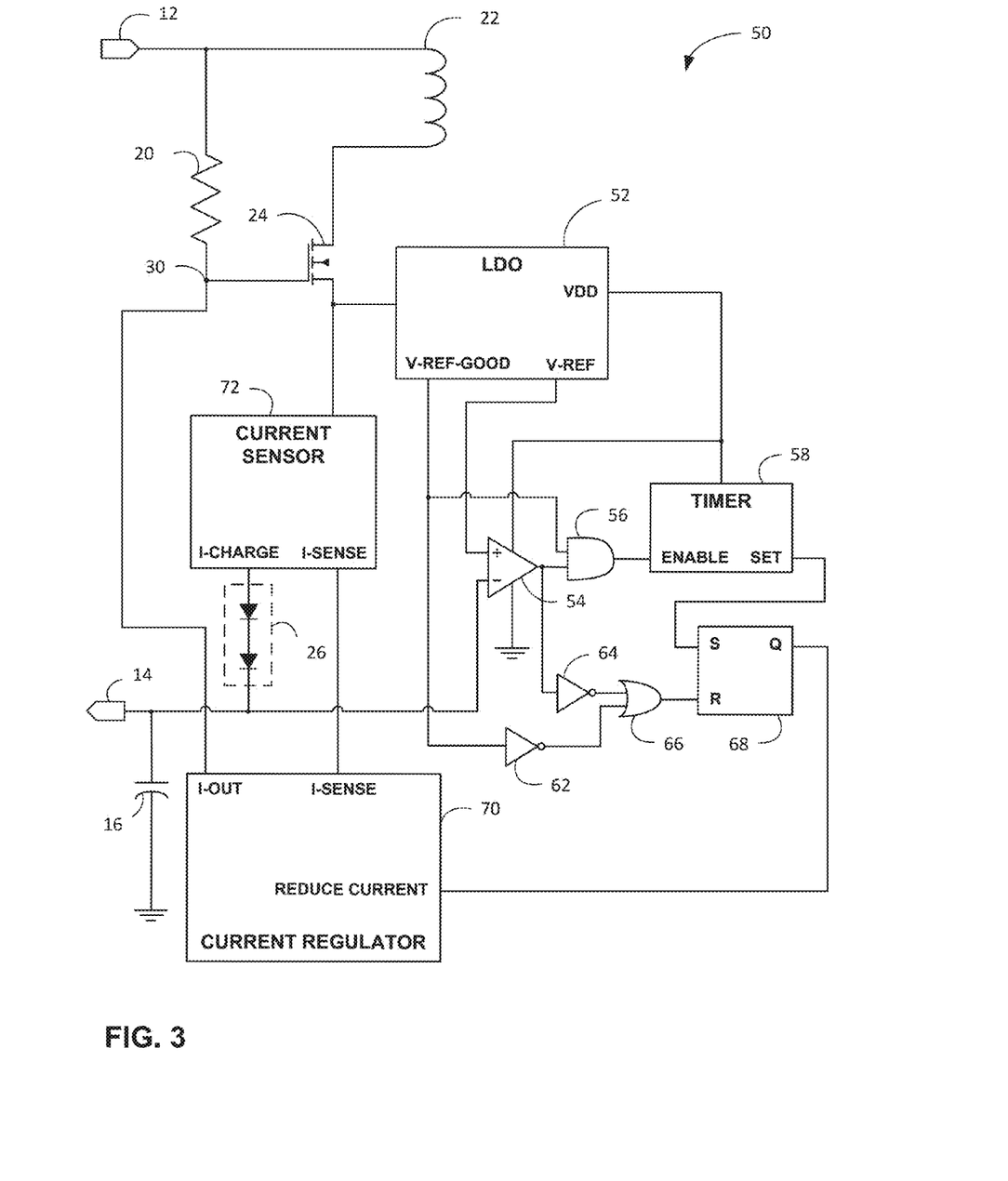
FIG. 3 is a conceptual block and circuit diagram illustrating a circuit with a comparator and a timer for charging an output voltage in accordance with some examples of this disclosure.

FIG. 3 is a conceptual block and circuit diagram illustrating a circuit 50 with a comparator 54 and a timer 58 for charging an output voltage in accordance with some examples of this disclosure. Circuit 50 may include components 4-30 that may have similar structure and function, as compared to components 4-30 in circuit 2, depicted in FIG. 1. LDO regulator 52, current regulator 70, and current sensor 72 may be similar to LDO regulator 8, current regulator 6, and current sensor 4 in circuit 2, but each component may have important differences as described below.

Current sensor 72 may receive an input signal from transistor 24 and deliver a charging current based on the input signal to output node 14. Current sensor 72 may be configured to deliver a relatively high charging current at startup. In some examples, a relatively high charging current may be on the order of three or four milliamperes. Current sensor 72 may be configured to reduce the charging current based on a determination by circuit 50 that output node 14 may be shorted to reference ground.

LDO regulator 52 may also receive the input signal from transistor 24. LDO regulator 52 may be configured to deliver three electrical signals based on the input signal received from transistor 24. First, LDO regulator 52 may deliver a reference voltage signal to comparator 54. In some examples, the reference voltage may be less than two volts or any other appropriate voltage. Second, LDO regulator 52 may deliver a signal indicating whether the reference voltage signal is charged, or "good" as shown in FIG. 3, to inverter 62. When the Vref-good signal is zero, SR latch 68 may receive a positive signal at the reset input of SR latch 68. Third, LDO regulator 52 may deliver a supply voltage Vdd to comparator 54 and timer 58.

Comparator 54 may be configured to compare the voltage at output node 14 to the reference voltage received from LDO regulator 52. By comparing the voltage at output node 14 to the reference voltage, comparator 54 may determine whether output node 14 is shorted to reference ground. An output of comparator 54 may be coupled to an input of logic gate 56. When the voltage at output node 14 is higher than the reference voltage, comparator 54 may deliver a negative voltage to logic gate 56. When the voltage at output node 14 is lower than the reference voltage, comparator 54 may deliver a positive voltage to logic gate 56. Comparator 54 may be an operational amplifier or any other suitable device for comparing two electrical signals.

Logic gate 56 may be configured to output a positive voltage signal only if logic gate 56 receives positive voltage signals at both input connections. Thus, logic gate 56 may be an AND gate. Logic gate 56 may output a positive voltage signal to timer 58 only if the voltage at output node 14 is lower than the reference voltage and the reference voltage signal is charged.

Timer 58 may be configured to receive a signal from logic gate 56 and output a signal to SR latch 68. A positive signal from logic gate 56 may indicate that the voltage at output node 14 is lower than a reference voltage. When timer 58 receives a positive signal from logic gate 56, timer 58 may send a positive signal to SR latch 68 after a threshold time duration. Timer 58 may be a sequential circuit that may include one or more transistors, switches, resistors, and capacitors, configured to delay an output signal by the threshold time duration. In some examples, the threshold time duration may be on the order of ten to twenty milliseconds. Timer 58 may include a digital bit counter with an oscillator input.

Inverters 62 and 64 may be configured to invert the Vref-good signal and the comparator output signal, respectively. Inverters 62, 64 may deliver inverted signals to logic gate 66. Logic gate 66 may be configured to output a signal to SR latch 68 based on the inverted signals from inverters 62, 64. Logic gate 66 may output a positive signal to SR latch 68 if the voltage at output node 14 is higher than the reference voltage or if the reference voltage has not charged yet. Logic gate 66 may output a negative signal to SR latch 68 only if the voltage at output node 14 is lower than the reference voltage and if the reference voltage is charged. Logic gates 56, 66 and inverters 62, 64 may use complimentary MOS ("CMOS") logic, transistor-transistor logic ("TTL"), or any appropriate protocol. Inverters 62, 64 may also be referred to herein as logic gates.

SR latch 68 may be configured to output a positive signal to current regulator 70 only if the voltage at output node 14 is lower than the reference voltage after timer 58 expires. The set input of SR latch 68 may be coupled to the output of timer 58, and the reset input of SR latch 68 may be coupled to the output of logic gate 66. SR latch 68 may be configured to output a positive signal to current regulator 70 only if the signal at the set input is positive and the signal at the reset input is negative or zero.

Current regulator 70 may be configured to control the voltage at control node 30 based on receiving a positive signal from SR latch 68. Through control node 30, current regulator 70 may control the voltage at the lower load terminal of transistor 24, thereby reducing the charging current that current sensor 72 delivers to output node 14. A positive signal from SR latch 68 may indicate that the voltage at output node 14 has been lower than the reference voltage for a threshold time duration, possibly indicating that output node 14 is shorted to reference ground.

Circuit 50 may be configured to deliver a relatively high charging current to output node 14 at startup. If the voltage at output node 14 is lower than a reference voltage, comparator 54 enables a timer. If the voltage at output node 14 is lower than a reference voltage after a threshold time duration, current regulator 70 may reduce the charging current to a safe level. Thus, circuit 50 may be configured to reduce the charging current, based on determining that, after a threshold time duration, the voltage at output node 14 is still lower than the reference voltage.

The logic, digital, and analog components in FIGS. 1 and 3 are exemplary and may have different orientations in some examples. Depending on the desired output, the voltage at output node 14 may be positive or negative. For example, transistor 24 may be an n-type or p-type transistor, depending on the desired voltage at output node 14. Moreover, the orientation of comparator 54 and diodes 26 may reverse if the desired voltage at output node 14 is negative or positive.

Figure 4:
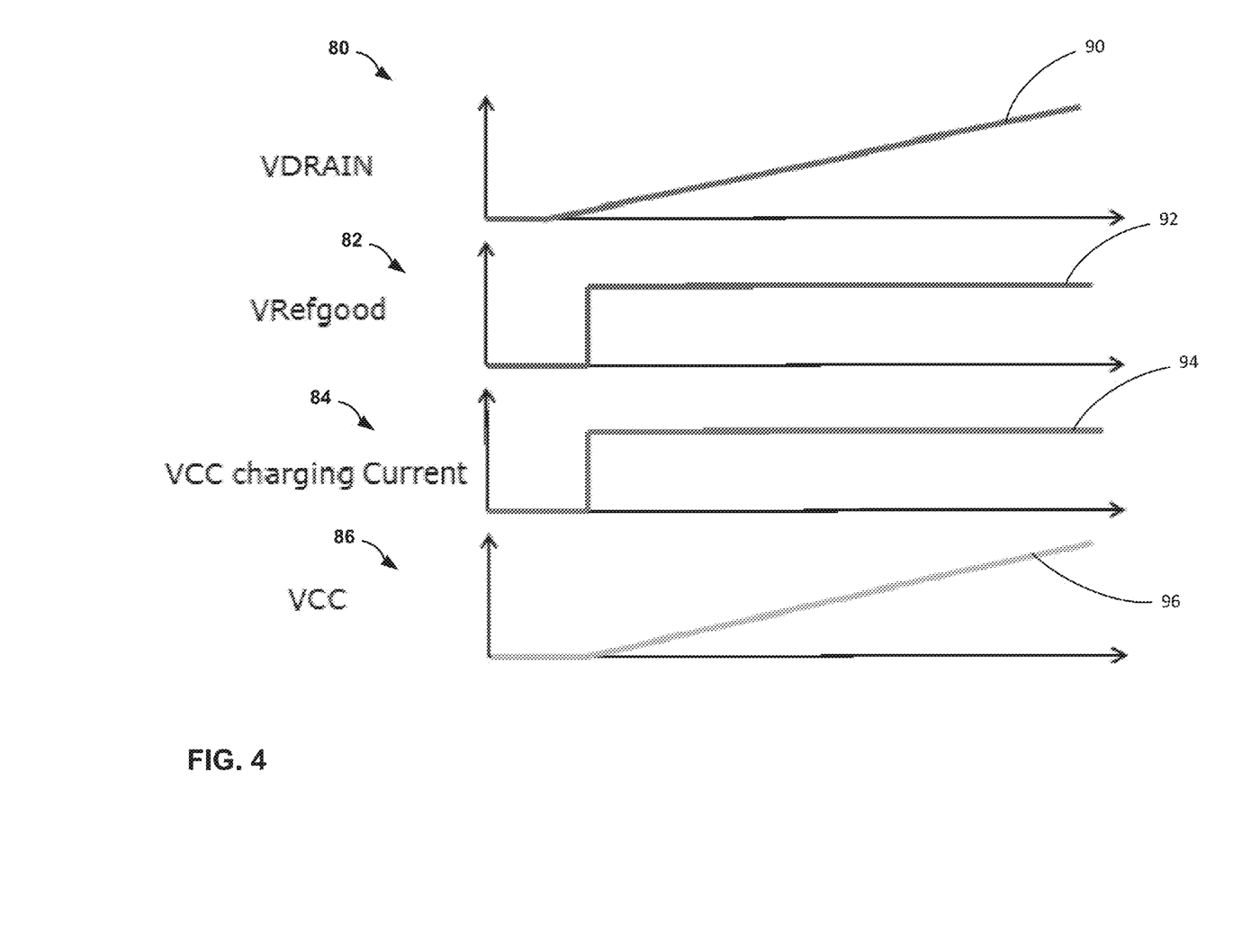
FIG. 4 is a graphical comparison of four graphs of an input voltage, a second voltage, a charging current, and an output voltage over time in accordance with some examples of this disclosure.

FIG. 4 is a graphical comparison of four graphs 80, 82, 84, 86 of an input voltage 90, a second voltage 92, a charging current 94, and an output voltage 96 over time in accordance with some examples of this disclosure. The horizontal axes of graphs 80, 82, 84, 86 may represent time, the vertical axes of graphs 80, 82, 86 may represent voltage, and the vertical axis of graph 84 may represent electrical current.

At system or device startup, input voltage 90 may increase. Input voltage 90 may represent the voltage at the lower load terminal of transistor 24 in FIG. 3. The lower load terminal of transistor 24 may be called a drain, depending on whether transistor 24 is an n-type or p-type transistor. The voltage at the lower load terminal of transistor 24 may supply current sensor 72 with the voltage needed to generate charging current 94.

As input voltage 90 increases, second voltage 92 and charging current 94 increase to a constant level. Second voltage 92 may represent whether the reference voltage delivered by LDO regulator 52 to comparator 54 in FIG. 3 is charged. With charging current 94 at a constant positive level, output voltage 96 may increase. Output voltage 96 may represent the voltage at output node 14 in FIG. 3.

Graphs 80, 82, 84, 86 may depict the charging scenario when output node 14 in FIG. 3 is not shorted to reference ground. Current sensor 72 in FIG. 3 may increase charging current 94 to a relatively high level, while components such as comparator 54, timer 58, and SR latch 68 may determine whether output voltage 96 is higher than the reference voltage after a threshold time duration.

Figure 5:
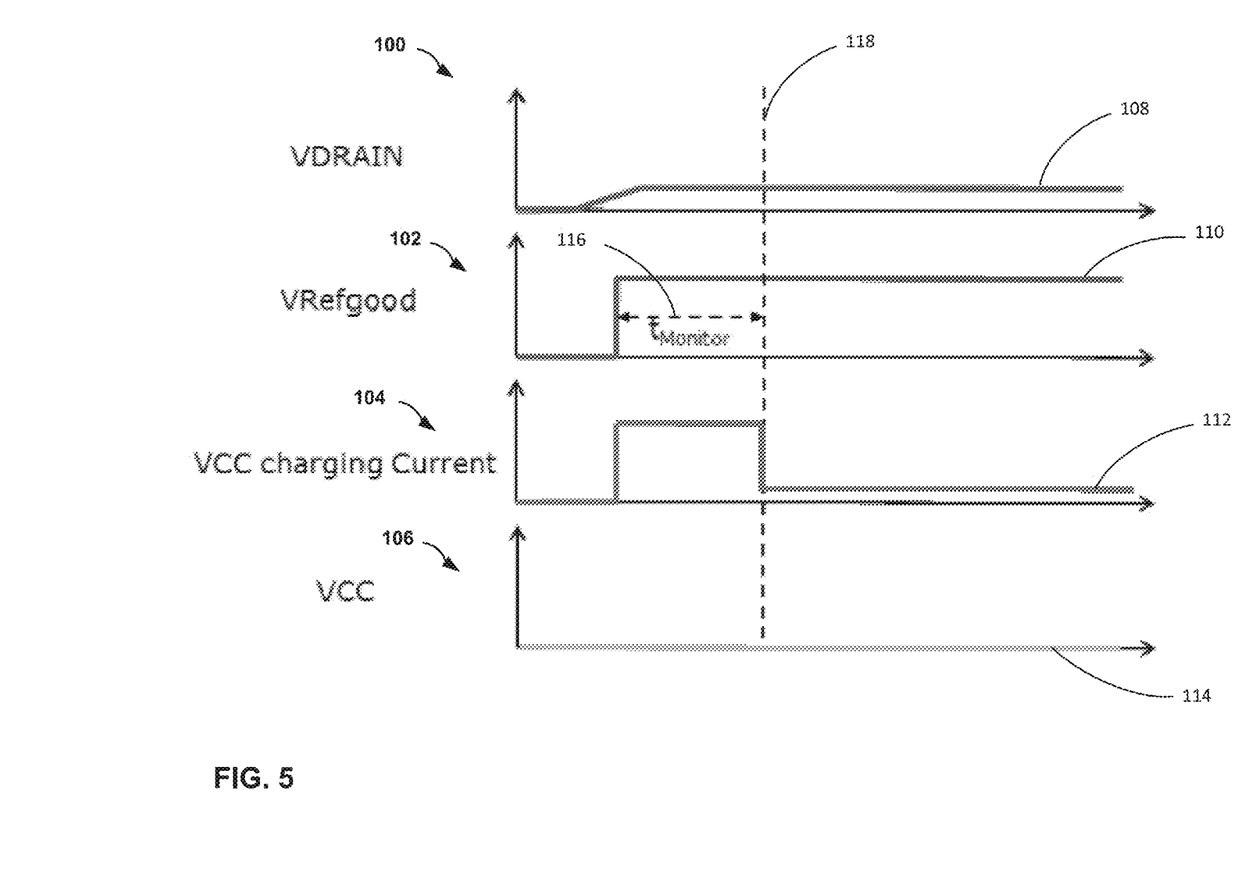
FIG. 5 is a graphical comparison of four graphs of an input voltage, a second voltage, a charging current, and an output voltage over time in accordance with some examples of this disclosure.

FIG. 5 is a graphical comparison of four graphs 100, 102, 104, 106 of an input voltage 108, a second voltage 110, a charging current 112, and an output voltage 114 over time in accordance with some examples of this disclosure. The horizontal axes of graphs 100, 102, 104, 106 may represent time, the vertical axes of graphs 100, 102, 106 may represent voltage, and the vertical axis of graph 104 may represent electrical current.

At startup, input voltage 108 may increase, causing second voltage 110 and charging current 112 to increase. Despite the increase in charging current 112, output voltage 114 may remain at zero, possibly because output node 14 in FIG. 3 is shorted to reference ground. Circuit 50 in FIG. 3 may compare output voltage 114 to a reference voltage after threshold time duration 116. If output voltage 114 is lower than the reference voltage, circuit 50 may reduce charging current 112 to a minimal amount at time 118. In some examples, the minimal amount may be on the order of two hundred microamperes.

By increasing charging current 112 at startup, circuit 50 may quickly charge output voltage 114. Moreover, by monitoring output voltage 114, circuit 50 may reduce power dissipation when output voltage 114 is shorted to reference ground.

Figure 6:
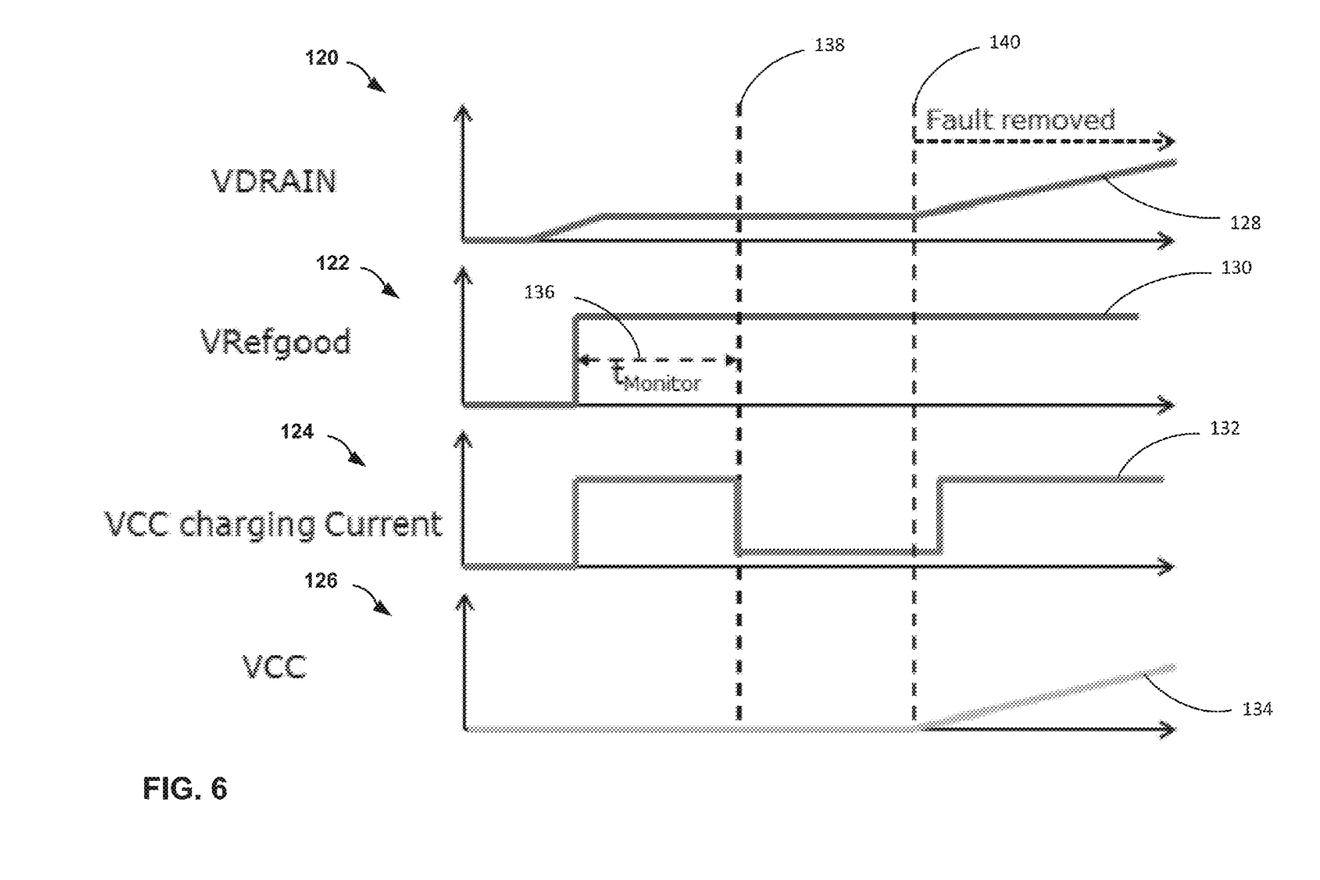
FIG. 6 is a graphical comparison of four graphs of an input voltage, a second voltage, a charging current, and an output voltage over time in accordance with some examples of this disclosure.

FIG. 6 is a graphical comparison of four graphs 120, 122, 124, 126 of an input voltage 128, a second voltage 130, a charging current 132, and an output voltage 134 over time in accordance with some examples of this disclosure. The horizontal axes of graphs 120, 122, 124, 126 may represent time, the vertical axes of graphs 120, 122, 126 may represent voltage, and the vertical axis of graph 124 may represent electrical current.

At startup, input voltage 128 may increase, causing second voltage 130 and charging current 132 to increase. Despite the increase in charging current 132, output voltage 134 may remain at zero, possibly because output node 14 in FIG. 3 is shorted to reference ground. Circuit 50 in FIG. 3 may compare output voltage 134 to a reference voltage after threshold time duration 136. If output voltage 134 is lower than the reference voltage, circuit 50 may reduce charging current 132 to a minimal amount at time 138.

Output voltage 134 may not increase above zero because output node 14 may be shorted to reference ground. Circuit 50 may determine that output node 14 is shorted to reference ground by comparing the voltage at output node 14 to the reference voltage. If, at some point after time 138, circuit 50 determines that output node 14 is no longer shorted to reference ground, input voltage 128 and output voltage 134 may increase at time 140. Output voltage 134 may increase because charging current 132 may be a nonzero amount that charges output voltage 134 when the short, or fault, to reference ground disappears or is removed.

Output voltage 134 may be higher than the reference voltage at some time after time 140. At that time, comparator 54 may output a negative signal to inverter 64 in FIG. 3. The signal may pass through inverter 64 and logic gate 66 to SR latch 68, resetting the reduce-current signal to zero. If current regulator 70 does not receive the reduce-current signal from SR latch 68, current regulator 70 may control the voltage at control node 30 to increase charging current 132.

As shown in FIGS. 5 and 6, circuit 50 may monitor the voltage at output node 14. If output voltage 134 indicates a short to reference ground, circuit 50 may reduce charging current 132 to a low level. If the output voltage 134 indicates the short is removed, circuit 50 may increase charging current 134. The protection against ground shorts allows circuit 50 to use a higher maximum charging current at startup.

Figure 7:
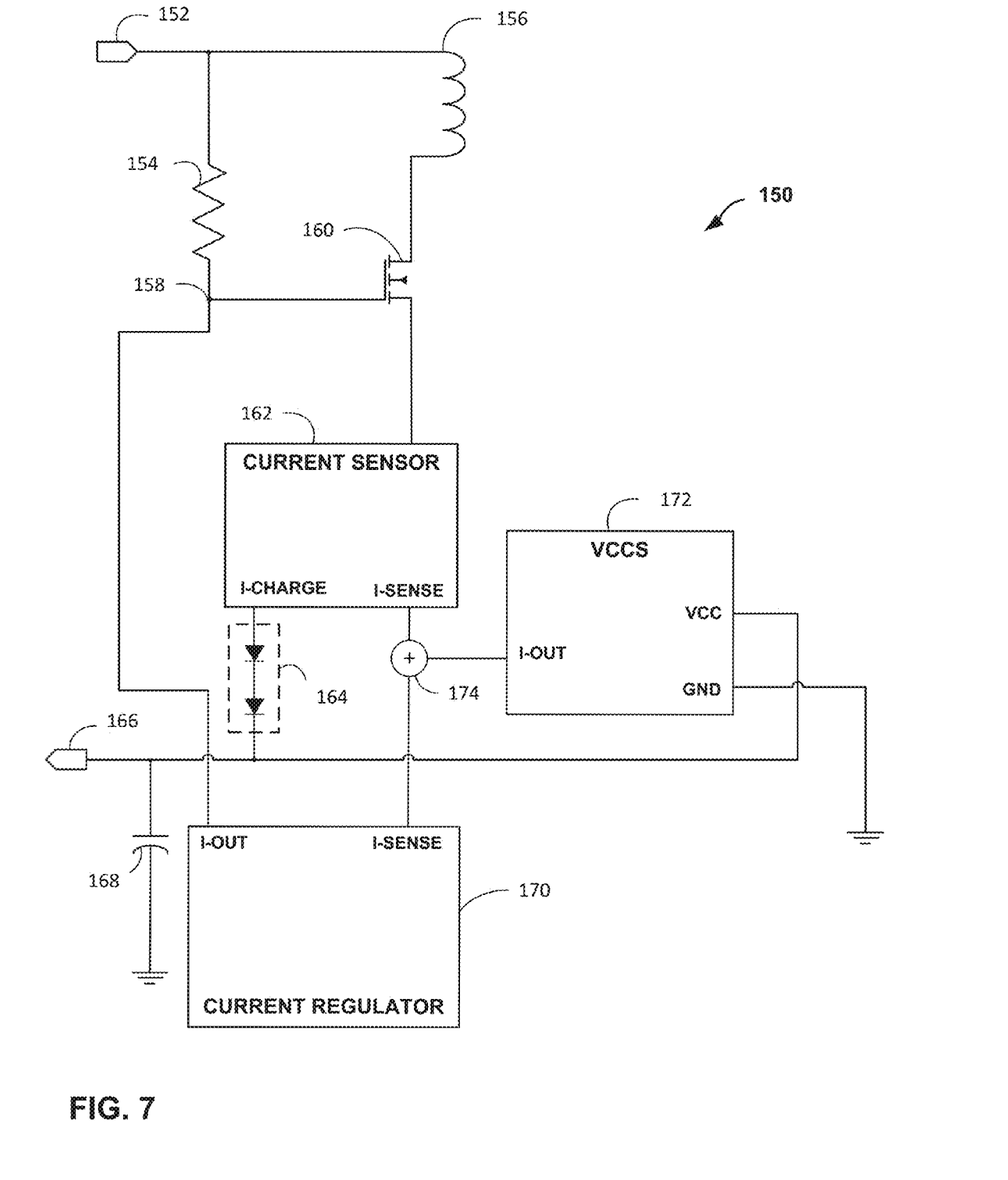
FIG. 7 is a conceptual block and circuit diagram illustrating a circuit with a voltage-controlled current source in accordance with some examples of this disclosure.

FIG. 7 is a conceptual block and circuit diagram illustrating a circuit 150 with a VCCS 172 in accordance with some examples of this disclosure. Components 152-170 may operate in a similar manner to components 12, 14, 16, 20, 22, 24, 26, 30, 70, 72 within circuit 50 in FIG. 3, with some differences noted below.

Output node 166 may be coupled to VCCS 172 so that VCCS 172 may receive a signal indicating the voltage at output node 166. VCCS 172 may be configured to receive (or deliver, based on the convention) an offset current to addition node 174 based on the voltage at output node 166. Current sensor 162 may deliver a sense current based on the charging current. Addition node 166 may distribute the offset current from current sensor 162 to VCCS 172 and current regulator 170, based on how much current VCCS 172 pulls from addition node 166.

VCCS 172 may be configured to receive a high offset current from addition node 174 when the voltage at output node 166 is low. The high offset current from VCCS 172 may decrease the electrical current received by current regulator 170, thereby causing current regulator 170 to control the voltage at control node 158 to reduce the charging current. In contrast, when the voltage at output node 166 is high, VCCS 172 may receive a low offset current from addition node 174, which may cause current regulator 170 to control the voltage at control node 158 to increase the charging current. The offset current may be zero when the voltage at output node 166 is higher than the reference voltage. In some examples, the offset current may be constant or proportional to the voltage at control node 158 when the voltage at output node 166 is higher than the reference voltage. In other examples, the offset current may not be proportional to the voltage at output node 166 but may be related to the voltage at output node 166 in other some way.

Figure 8:
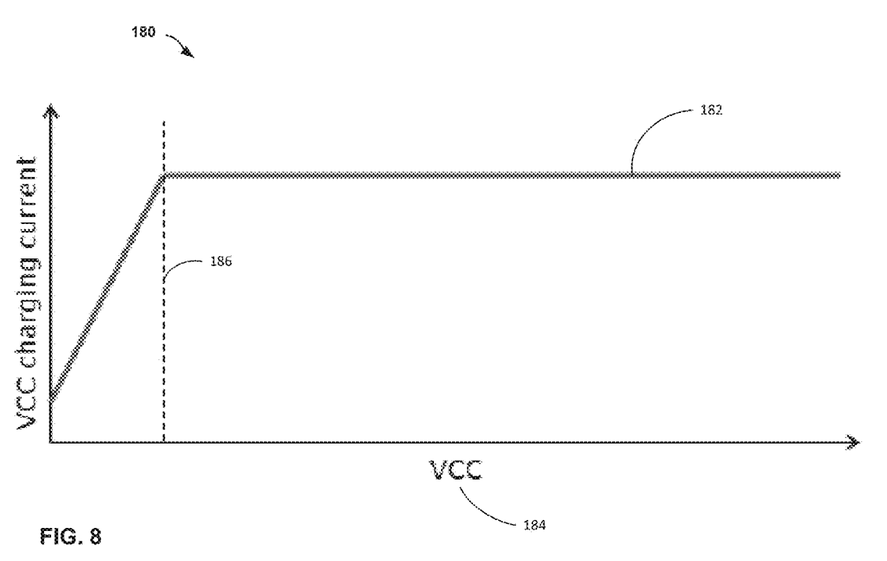
FIG. 8 illustrates a graph of a charging current as a function of an output voltage in accordance with some examples of this disclosure.

FIG. 8 illustrates a graph 180 of a charging current 182 as a function of an output voltage 184 in accordance with some examples of this disclosure. The horizontal axis of graph 180 may represent the output voltage 184 at an output node, such as output node 166 in FIG. 8. The vertical axis of graph 180 may represent charging current 182.

When output voltage 184 is zero, circuit 150 in FIG. 7 may be configured to deliver charging current 182 at a low magnitude to minimize power dissipation. Output voltage 184 may be zero when output node 166 is shorted to reference ground. When output node 166 is shorted to reference ground, output voltage 184 may not increase above zero, which may result in significant power dissipation and possible system damage for high charging currents. When output node 166 is shorted to reference ground, the offset current received by VCCS 172 may be at the largest magnitude.

When output voltage 184 is higher than zero and lower than reference voltage 186, circuit 150 in FIG. 7 may be configured to increase charging current 182 in proportion to the output voltage 184. VCCS 172 in FIG. 7 may receive an offset current from addition node 174 that decreases as output voltage 184 increases. Based on this current, current regulator 170 and current sensor 162 may increase charging current 182 by controlling the voltage at the control terminal of transistor 160 to influence the input signal received by current sensor 162.

When output voltage 184 is higher than reference voltage 186, circuit 150 in FIG. 7 may be configured to deliver a charging current 182 at a constant magnitude regardless of output voltage 184. In some examples, reference voltage 186 may be lower than two volts, or some other appropriate voltage based on the considerations of quick charge time and reduced power dissipation. Charging current 182 may be capped at a level when output voltage 184 is higher than reference voltage 186.

By linking charging current 182 to output voltage 184, circuit 150 may quickly charge output voltage 184. Additionally, circuit 150 may detect when output node 166 may be shorted to reference ground and when the short circuit is removed.

Figure 9:
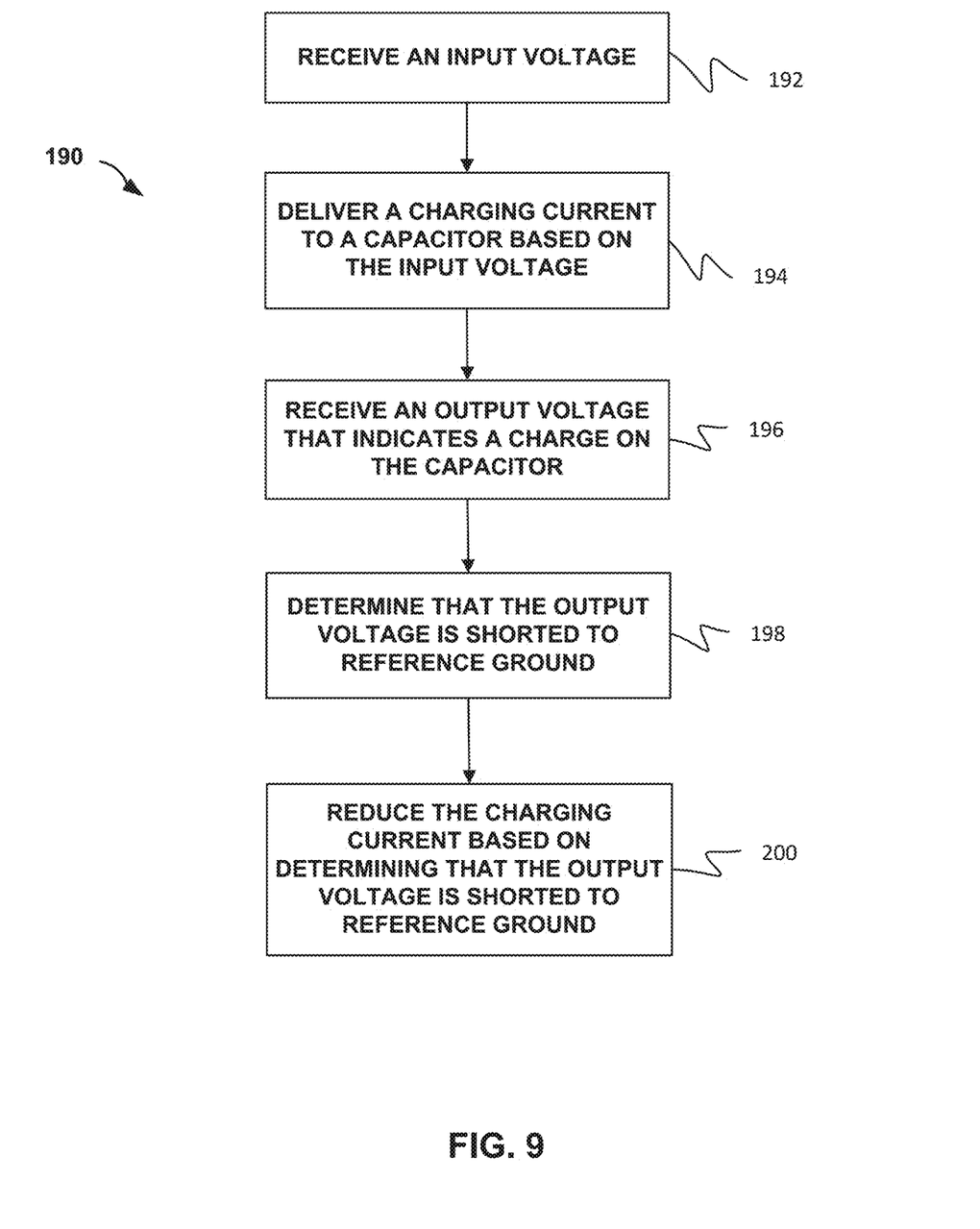
FIG. 9 is a flowchart illustrating an example process for charging an output voltage in accordance with some examples of this disclosure.

FIG. 9 is a flowchart illustrating an example process 190 for charging an output voltage in accordance with some examples of this disclosure. Process 190 is described from the perspective of circuit 50 in FIG. 3, but circuit 2 in FIG. 1 and circuit 150 in FIG. 7 may also perform process 190. As shown in FIG. 9, circuit 50 may receive an input voltage (192). Circuit 50 may receive the input voltage from the lower load terminal of transistor 24. Circuit 50 may use the input voltage to charge a reference voltage and a supply voltage at LDO regulator 52.

Circuit 50 may deliver a charging current to a capacitor 16 based on the input voltage (194). Current sensor 72 may deliver the charging current through diodes 26 to output node 14. Current sensor 72 may also deliver a sense current based on the input voltage to current regulator 70.

Circuit 50 may receive an output voltage that indicates a charge on the capacitor 16 (196). The output voltage may also indicate the voltage at output node 14. Comparator 54 may receive and compare the output voltage to the reference voltage generated by LDO regulator 52.

Circuit 50 may determine that the output voltage is shorted to reference ground (198). Comparator 54 may compare the output voltage to a reference voltage that is close to the voltage of the reference ground. Comparator 54 may output a signal indicating whether the output voltage is lower than the reference voltage to timer 58 and SR latch 68 through logic gates 56, 62, 64, 66.

Circuit 50 may reduce the charging current based on determining that the output voltage is shorted to reference ground (200). If comparator 54 indicates that the output voltage is lower than the reference voltage, timer 58 may send a delayed signal to SR latch 68. SR latch 68 may send a reduce-current signal to current regulator 70 only if the output voltage is lower than the reference voltage after a threshold time duration. In response to the reduce-current signal, current regulator 70 may control the voltage at the load terminal of transistor 24 to reduce the charging current.

The following numbered examples demonstrate one or more aspects of the disclosure.

Example 1

A circuit configured to receive an input signal and deliver, based on the input signal, a charging current to a capacitor. The circuit is further configured to receive an output voltage that indicates a charge on the capacitor; determine that the output voltage is shorted to a reference ground. The circuit is further configured to reduce, based on determining that the output voltage is shorted to the reference ground, the charging current.

Example 2

The circuit of example 1, wherein the circuit is configured to determine that the output voltage is shorted to the reference ground by at least determining that the output voltage is shorted to the reference ground for longer than a threshold time duration.

Example 3

The circuit of any combination of examples 1-2, further configured to determine, after reducing the charging current, that the output voltage is not shorted to the reference ground. The circuit is further configured to increase, based on determining that the output voltage is not shorted to the reference ground, the charging current.

Example 4

The circuit of any combination of examples 1-3, wherein the circuit is configured to increase the charging current by at least delivering a charging current of a first magnitude higher than one milliampere.

Example 5

The circuit of any combination of examples 1-4, wherein the circuit is configured to reduce the charging current by at least reducing the charging current to a second magnitude lower than five hundred microamperes.

Example 6

The circuit of any combination of examples 1-5, wherein the circuit is configured to reduce the charging current by at least reducing the input signal.

Example 7

The circuit of any combination of examples 1-6, wherein the circuit is configured to compare the output voltage to the reference voltage by at least delivering the output voltage to a first input of a comparator; and delivering the reference voltage to a second input of a comparator.

Example 8

The circuit of any combination of examples 1-7, wherein the circuit is configured to determine that the output voltage is shorted to the reference ground by at least comparing the output voltage to a reference voltage.

Example 9

The circuit of any combination of examples 1-8, wherein the circuit is configured to set a timer based on the output of the comparator.

Example 10

A circuit configured to: receive an output voltage that indicates a charge on a capacitor. The circuit is further configured to determine that the output voltage is lower than a reference voltage. The circuit is further configured to deliver, based on determining that the output voltage is lower than the reference voltage, a charging current to a capacitor, wherein the charging current is proportional to the output voltage when the output voltage is lower than the reference voltage.

Example 11

The circuit of example 10, further configured to determine that the output voltage is higher than the reference voltage. The circuit is further configured to deliver, based on determining that the output voltage is higher than the reference voltage, the charging current to the capacitor, wherein the charging current is not based on the output voltage when the output voltage is higher than the reference voltage.

Example 12

The circuit of any combination of examples 10-11, wherein the charging current is higher than one milliampere when the output voltage is higher than the reference voltage.

Example 13

The circuit of any combination of examples 10-12, further configured to: control, based on determining that the output voltage is lower than the reference voltage, an input signal, wherein the charging current is based on the input signal.

Example 14

The circuit of any combination of examples 10-13, wherein the circuit is configured to determine that the output voltage is lower than the reference voltage by at least: delivering an offset current based on the output voltage; and delivering, based on the offset current and the charging current at a previous time, the charging current to the capacitor; wherein the offset current is zero when the output voltage is higher than the reference voltage, and wherein the offset current is proportional to the output voltage when the output voltage is lower than the reference voltage.

Example 15

The circuit of any combination of examples 10-14, wherein the circuit is configured to determine that the output voltage is lower than the reference voltage by at least delivering the output voltage to a voltage-controlled current source.

Example 16

The circuit of any combination of examples 10-15, wherein the charging current is lower than five hundred microamperes when the output voltage is zero.

Example 17

A method comprising: delivering a charging current to a capacitor; receiving an output voltage that indicates the charge on the capacitor; comparing the output voltage to a reference voltage; controlling, based on comparing the output voltage to a reference voltage, the charging current.

Example 18

The method of example 17, further comprising: determining that the output voltage is shorted to a reference ground for longer than a threshold time duration. The method further comprises reducing, based on determining that the output voltage is shorted to the reference ground, the charging current.

Example 19

The method of any combination of examples 17-18, further comprising: determining, after reducing the charging current, that the output voltage is not shorted to the reference ground. The method further comprises increasing, based on determining that the output voltage is not shorted to the reference ground, the charging current.

Example 20

The method of any combination of examples 17-19, further comprising: determining that the output voltage is lower than a reference voltage, wherein the charging current is proportional to the output voltage when the output voltage is lower than the reference voltage.

Various examples of the disclosure have been described. Any combination of the described systems, operations, or functions is contemplated. These and other examples are within the scope of the following claims.

What is claimed is:

1. A circuit configured to:
receive an input signal;
deliver, based on the input signal, a charging current to a capacitor;
receive an output voltage that indicates a charge on the capacitor;
determine that the output voltage is shorted to a reference ground; and
reduce, based on determining that the output voltage is shorted to the reference ground, the charging current.

2. The circuit of claim 1, wherein the circuit is configured to determine that the output voltage is shorted to the reference ground by at least determining that the output voltage is shorted to the reference ground for longer than a threshold time duration.

3. The circuit of claim 1, further configured to:
determine, after reducing the charging current, that the output voltage is not shorted to the reference ground; and
increase, based on determining that the output voltage is not shorted to the reference ground, the charging current.

4. The circuit of claim 3, wherein the circuit is configured to increase the charging current by at least delivering a charging current of a first magnitude higher than one milliampere.

5. The circuit of claim 1,
wherein the circuit is configured to reduce the charging current by at least reducing the charging current to a second magnitude lower than five hundred microamperes.

6. The circuit of claim 1, wherein the circuit is configured to reduce the charging current by at least reducing the input signal.

7. The circuit of claim 1, wherein the circuit is configured to determine that the output voltage is shorted to the reference ground by at least comparing the output voltage to a reference voltage.

8. The circuit of claim 7, wherein the circuit is configured to compare the output voltage to the reference voltage by at least:
delivering the output voltage to a first input of a comparator; and
delivering the reference voltage to a second input of a comparator.

9. The circuit of claim 8, wherein the circuit is configured to set a timer based on the output of the comparator.

10. A circuit configured to:
receive an output voltage that indicates a charge on a capacitor;
determine that the output voltage is lower than a reference voltage; and
deliver, based on determining that the output voltage is lower than the reference voltage, a charging current to a capacitor,
wherein the charging current is proportional to the output voltage when the output voltage is lower than the reference voltage.

11. The circuit of claim 10, further configured to:
determine that the output voltage is higher than the reference voltage; and
deliver, based on determining that the output voltage is higher than the reference voltage, the charging current to the capacitor,
wherein the charging current is not based on the output voltage when the output voltage is higher than the reference voltage.

12. The circuit of claim 11, wherein the charging current is higher than one milliampere when the output voltage is higher than the reference voltage.

13. The circuit of claim 10, further configured to:
control, based on determining that the output voltage is lower than the reference voltage, an input signal,
wherein the charging current is based on the input signal.

14. The circuit of claim 10, wherein the circuit is configured to determine that the output voltage is lower than the reference voltage by at least:
delivering an offset current based on the output voltage; and
delivering, based on the offset current and the charging current at a previous time, the charging current to the capacitor;
wherein the offset current is zero when the output voltage is higher than the reference voltage, and
wherein the offset current is proportional to the output voltage when the output voltage is lower than the reference voltage.

15. The circuit of claim 10, wherein the circuit is configured to determine that the output voltage is lower than the reference voltage by at least delivering the output voltage to a voltage-controlled current source.

16. The circuit of claim 10, wherein the charging current is lower than five hundred microamperes when the output voltage is zero.

17. A method comprising:
   delivering a charging current to a capacitor;
   receiving an output voltage that indicates the charge on the capacitor;
   comparing the output voltage to a reference voltage;
   controlling, based on comparing the output voltage to a reference voltage, the charging current.

18. The method of claim 17, further comprising:
   determining that the output voltage is shorted to a reference ground for longer than a threshold time duration; and
   reducing, based on determining that the output voltage is shorted to the reference ground, the charging current.

19. The method of claim 18, further comprising:
   determining, after reducing the charging current, that the output voltage is not shorted to the reference ground; and
   increasing, based on determining that the output voltage is not shorted to the reference ground, the charging current.

20. The method of claim 17, further comprising:
   determining that the output voltage is lower than a reference voltage, wherein the charging current is proportional to the output voltage when the output voltage is lower than the reference voltage.

\* \* \* \* \*